United States Patent [19]

Sumi et al.

[11] Patent Number: 5,023,098

[45] Date of Patent: Jun. 11, 1991

[54] METHOD OF PRODUCING PRESSURIZED GAS-ENTRAPPING CANDY

[75] Inventors: Naoki Sumi; Keizo Mochizuki; Yoshio Moriyama, all of Kawasaki; Mitsuhiro Sakurai, Tokyo, all of Japan

[73] Assignee: Meiji Seika Kaisha, Tokyo, Japan

[21] Appl. No.: 432,821

[22] Filed: Nov. 7, 1989

[51] Int. Cl.$^5$ ............................................. A23G 3/00
[52] U.S. Cl. ................... 426/474; 426/312; 426/410; 426/470; 426/512; 426/515; 426/524; 426/660; 426/661
[58] Field of Search ............... 426/470, 474, 660, 661, 426/512, 515, 312, 524, 410

[56] References Cited

U.S. PATENT DOCUMENTS

| | | | |
|---|---|---|---|
| 3,012,893 | 12/1961 | Kremzner et al. | 426/470 |
| 3,985,909 | 10/1976 | Kirkpatrick | 426/572 |
| 4,001,457 | 1/1977 | Hegadorn | 426/572 |
| 4,271,206 | 6/1981 | Fariel et al. | 426/572 |
| 4,273,793 | 6/1981 | Fariel et al. | 426/572 |
| 4,282,263 | 8/1981 | Barnes et al. | 426/572 |
| 4,289,794 | 9/1981 | Kleiner et al. | 426/660 |
| 4,935,189 | 6/1990 | Mochizuki et al. | 426/474 |

FOREIGN PATENT DOCUMENTS 55-118347  9/1980  Japan.
57-103719  3/1984  Japan.

*Primary Examiner*—Donald E. Czaja
*Assistant Examiner*—Evan Federman
*Attorney, Agent, or Firm*—Armstrong, Nikaido, Marmelstein, Kubovcik & Murray

[57] ABSTRACT

A method of producing a pressurized gas-entrapping candy is disclosed, which candy releases the gas to generate pleasant sound in mouth, as it melts therein. The candy is produced by heating a mixture of raw materials and water to dissolve the mixture and to condense the same, forming fine air bubbles therein, cooling and shaping to convert the condensate to candy pieces of a desired form, dipping the shaped candy pieces into liquid nitrogen, taking out the candy pieces therefrom to put in a pressure vessel, charging into the vessel an inert gas under pressure, and heating the vessel to cause a partial melting of the candy piece and to entrap the gas in the candy piece.

8 Claims, No Drawings

METHOD OF PRODUCING PRESSURIZED GAS-ENTRAPPING CANDY

BACKGROUND OF THE INVENTION

1. Field of the Invention

The present invention relates to a method of producing a candy, and more particularly a pressurized gas-entrapping candy.

2. Related Art

For preparing a pressurized gas-entrapping candy, following methods have been known, namely a method comprising steps for putting a candy melt in a pressure vessel, charging a gas in the pressure vessel, heating and stirring the candy melt to entrap the gas, as bubbles in the candy melt, cooling the gas bubbles containing candy melt to cause a solidification thereof, and taking out the same [Jap. Pat. No. Sho 52-44268(A)], and another method comprising steps for putting a candy melt in a first pressure vessel, charging a gas in the pressure vessel, heating and stirring the candy melt to entrap the gas, as bubbles in the candy melt, charging the resulting gas bubbles containing candy melt in a second pressure vessel to cool and and cause a solidification therein [Jap. Pat. Nos. Sho 52-44269(A) and 53-6462(A)].

Each of these methods has, however, a disadvantage of that it is impossible rather than difficult to obtain a candy product having a constant size and shape, since the product has been obtained by crushing a solidified block into pieces.

Further, the present inventors have proposed such a method of producing a pressurized gas-entrapping candy, which comprises steps for putting candy particles in a pressure vessel, charging nitrogen, carbon dioxide or the like gas into the pressure vessel, heating the pressure vessel, while maintaining a space therein at a pressurized state to cause a mutual melting of the candy particles, cooling the vessel, while maintaining the pressure therein, and then releasing the pressure to take out the desired candy product [Jap. Pat. No. Sho 57-39151(B)].

The latter method has been actually carried out by the assignee company. According to this method, a suitable amount of hard candy particles is shaped into a piece, and the resulting pieces are put into the pressure vessel for the pressurized gas-entrapping step, in order to obtain the desired pressurized gas-entrapping candy product having a regular shape and size. The shaping step is carried out by charging the hard candy particles in a mold to press the same under pressure in a range of 50-200 kg/cm$^2$. In this case and in order to obtain the desired pressurized gas-entrapping candy product of about 10-30 mm in length, the shaping should be carried out in a room, wherein a humidity therein is kept in a quite low level, so as to prevent a difficulty in demolding of the molded piece. Such a mold is required as having a cavity to provide easier demolding, which limits a degree of free for selecting a shape of the product. Further, a careful handling of the molded piece is required, since it has a fragility.

In other words, the pressurized gas-entrapping candy product having a regular size and shape can not be obtained with use of the conventional methods as disclosed in said Jap. Pat. Nos. Sho 52-44268(A) and 53-6462(A). While, according to the other conventional method as disclosed in Jap. Pat. No. Sho 57-39151(B), such a product can be prepared, but the method has disadvantages that the shaping room kept a humidity in quite low level is required to increase an additional cost therefor, and that a productivity is limited, in view point of handling of the fragile molded piece.

SUMMARY OF THE INVENTION

An object of the invention is to provide a method of producing a pressurized gas-entrapping candy having a regular size and an optional shape, without cause any difficulty in shaping and without use any special instrument.

According to the invention, the object can be attained by a method of producing a pressurized gas-entrapping candy, which comprises steps of heating a mixture of raw materials and water to dissolve the mixture and to condense the same at a temperature of 140°-160° C., forming fine air bubbles therein, cooling and shaping to convert the condensate to a desired shape, dipping the shaped candy pieces into liquid nitrogen, taking out the candy pieces therefrom to put in a pressure vessel, charging a pressurized inert gas to the vessel to set an inner pressure at a specified level, heating the pressure vessel to cause a partial melting of the the shaped pieces and to entrap the gas in each candy piece, while maintaining the pressure in the vessel, cooling the vessel, while maintaining the pressure in the vessel, and then releasing the pressure in the vessel to take out the solidified candy product.

The raw materials to be used for preparing the candy are a mixture of sucrose, glucose, lactose, corn syrup, a starch hydrolysate containing oligosaccharides which contain, as a main component, tetra and more higher saccharides, or the like.

To prepare the pressurized gas-entrapping candy according to the invention, in the first place, a suitable amount of water, flavour and coloring agent are added to the raw materials to mix therewith, and the resulting mixture is condensed. Please note that the temperature of mixture in this condensation step should be kept in said range of 140°-160° C., since if the condensation is carried out at a mixture temperature of below 140° C., the resulting condensate becomes too soft, due to its excess moisture content, to make difficult an entrapping of the pressurized gas therein, to be carried out later and if the mixture temperature becomes higher than 160° C., a browning tends to occur due to a thermal decomposition of the saccharide components, which means it is difficult to obtain a desirable final candy product attractive to consumers.

In the next place, fine air bubbles are formed in the resulting condensate, This step may be done by stirring the condensate under a pressure or through a pulling operation. In the former case, the operation is carried out by charging the condensate in a pressure vessel with an stirrer, which vessel was previously heated at about 150° C. by feeding superheated steam in a jacket therefor, charging compressed air to the vessel to keep an inner pressure in a range of 1-5 kg/cm$^2$, and stirring the condensate for 5-15 minutes under 70-300 rpm, while keeping the inner pressure of the vessel. In the latter case, the pulling operation may be carried out manually with use of a hook or with use of a pulling machine for candies. It is preferable to carry out the pulling operation under a condensate temperature of 90°-110° C., since if the condensate temperature is below 90° C., a viscosity of the condensate becomes too high to make difficult the operation per se and if the condensate temperature is higher than 110° C., a viscosity thereof is too low for maintaining of fine air bubbles therein in a sufficient amount.

It is preferable that the resulting condensate keeps therein the fine air bubbles in a level of 5% or more based on a volume of the condensate. This is apparent from results shown in the following Table.

| Air bubble content (%) | 1 | 3 | 5 | 7 | 10 |
|---|---|---|---|---|---|
| Sound pressure level (dB) | 0 | 40 | 60 | 65 | — |

The Table shows a relation between the content of air bubbles in the condensate and the sound pressure to be generated when a pressurized gas-entrapping candy prepared with use of the condensate having a specified air bubble content melts. It is apparent from the Table that the pressurized gas-entrapping candy with use of the condensate having air bubble content of below 5% shows a relatively low sound pressure level, whereby a consumer does not feel as a pleasant sound. On the contrary thereto, the candies with use of the condensates having air bubble contents of 5% and 7% show sound pressures of 60 dB and 65 dB, respectively to give a pleasant sound feel for the consumer, as it melts in his mouth.

The condensate containing number of fine air bubbles therein is cooled and extruded in a rod-like form, which is then treated with use of a conventional candy shaping machine such as a pill forming machine, roll shaping machine or the like to make the cooled condensate into a desired shape having a constant size.

The resulting shaped candy pieces are then dipped into liquid nitrogen and taken out therefrom. The dipping treatment causes a rapid-freezing of the shaped candy pieces to form cracks in outer layer and inside thereof. The required period of time for the dipping operation depends on a size and shape of the shaped candy piece and other various factors, but in general, it is sufficient with a relatively short period of time until several minutes.

When the shaped candy pieces are dipped into liquid nitrogen, it is preferable to previously wrap each of the shaped candy pieces with use of a cold-resistant and heat-proof wrapping material such as aluminum foil or polyester film with aluminum layer formed by vacuum evaporation or lamination, since when the very cold (It is like a frozen) candy piece is taken out from the liquid nitrogen and contact with an ambient air, moisture in the air may condense on an outer surface of the candy piece and the resulting water may be absorbed into the same, but this can be effectively avoided by the wrapping of the candy piece prior to the dipping operation.

After removal of the wrapping, the cracked candy pieces are put into the pressure vessel and the inner gas to be entrapped in the candy pieces is charged in the vessel. As the inert gas, carbon dioxide gas or nitrogen gas can be employed but it is preferable to select the former, since it has been found through an experiment that the candy product entrapping carbon dioxide gas generates more higher sound pressure, than that entrapping nitrogen gas.

For preparing a desired pressurized gas-entrapping candy, it is required to increase an inner pressure of the vessel in a range of 10-50 kg/cm$^2$ with the inert gas (preferably with carbon dioxide gas) and to raise a temperature of the shaped candy piece in a range of 100°-140° C., on the following grounds. If the inner pressure of the vessel is less than 10 kg/cm$^2$, a pressure of the gas entrapped in the candy piece is not sufficient for generating pleasant sound in the mouth and while, even if the inner pressure is set to a value higher than 50 kg/cm$^2$, an appreciable increase is not recognized on the sound pressure. If the temperature of the shaped candy piece in the pressure vessel is below 100° C., the partial melting thereof becomes difficult to cause an insufficient gas-entrapping, and if the temperature is higher than 140° C., the shaped candy piece melts in excess to possibly cause its fluidization, which not only makes a sufficient gas-entrapping difficult but also causes a sticking of the final candy product to the vessel to make a troublesome a taking out thereof.

The carbon dioxide gas as inert gas charged under the pressure into the pressure vessel enters into the shaped candy through cracks formed by the dipping treatment into liquid nitrogen and reaches to fine cavities which have been formed by said stirring operation under pressure or drawing operation of the condensate and were occupied with air, until it was escaped through the treatment dipping into liquid nitrogen. And, the gas entered into the shaped candy piece is entrapped therein by the partial melting thereof through the heating treatment in the pressure vessel. The heating of the shaped candy in the pressure vessel can be carried out by externally heating the vessel, for instance by feeding superheated steam in a jacket of the vessel, or irradiating microwave therein to directly heat the shaped candy piece.

After completion of the gas-entrapping treatment, the pressurized gas-entrapping candy pieces are cooled to room temperature by externally cooling the vessel per se, for instance by feeding water to the jacket in lieu of the superheated steam, while maintaining the inner pressure of the vessel in said level. Then, the gas in the vessel is released to recover the same and the desired pressurized gas-entrapping candy pieces are taken out from the vessel. Each of the candy pieces is wrapped and wrapped candy pieces are packed in a carton or can for sale, in a conventional manner.

PREFERRED EMBODIMENTS OF THE INVENTION

The invention will now be further explained in more detail with reference to Examples.

EXAMPLE 1

To 100 parts by weight of candy raw materials consisting of 55 parts by weight of sugar and 45 parts by weight of corn syrup, 40 parts by weight of water was added to mix the same and the resulting mixture was condensed at a mixture temperature of 150° C. to obtain a condensate. The condensate was poured into a pressure vessel with a stirrer. While maintaining an inner pressure of the vessel at 3 kg/cm$^2$ by charging compressed air therein, the stirrer was rotated at about 300 rpm. for 15 minutes to form number of fine air bubbles in the condensate, a volume of the air bubbles reaching 5% by volume based on the volume of the condensate. The resulting condensate containing the air bubbles therein was cooled to 100° C. and extruded in a rod-like form. The resulting elongated candy substance was cut into pieces. Each of the shaped candy pieces was wrapped with an aluminum foil and dipped into liquid nitrogen for 1 minute to form cracks in surface layer and inside of the shaped candy pieces.

After taking out from liquid nitrogen and removal of the wrapping, each of the candy pieces was put into a cylindrical pressure vessel having an inner diameter of 12 cm and with a jacket. While maintaining an inner pressure of the vessel at 50 kg/cm² by charging pressurized carbon dioxide gas therein, superheated steam was fed into the jacket of the vessel to heat the shaped candy pieces at a temperature of 120° C. and to keep such a state for 30 minutes. Then, while maintaining the inner pressure of the vessel at said level, water was fed into the jacket, in lieu of the superheated steam, until a temperature of the candy pieces in the vessel becomes the room temperature. Thereafter, the pressure in the vessel was released by recovering the carbon dioxide gas to take out the desired candy pieces from the vessel.

A sample of the resulting candy product was dropped into a water-bath of 150 ml to measure intensity of sound to be generated, as it melts and to find out that it generates pleasant sounds, each having a sound pressure of 60 dB.

EXAMPLE 2

To 100 parts by weight of candy raw materials consisting of 40 parts by weight of a starch hydrolysate which contains 61.3 parts by weight of oligosaccharides of tetra or more higher saccharides, 30 parts by weight of sugar and 30 parts by weight of lactose, 40 parts by weight of water was added to mix the same and the resulting mixture was condensed at a mixture temperature of 150° C. to obtain a condensate. The condensate was treated with use of a drawing machine for 5 minutes to form number of fine air bubbles in the condensate, a volume of the air bubbles reaching 5% based on that of the condensate. The resulting condensate containing the air bubbles therein was cooled to 100° C. and shaped into pieces with use of a roll-type shaping machine. Each of the shaped candy pieces was dipped into liquid nitrogen for 1 minute to form cracks in surface layer and inside of the shaped candy pieces.

After taking out from liquid nitrogen, each of the candy pieces was put into a cylindrical pressure vessel having an inner diameter of 12 cm and with a jacket. While maintaining an inner pressure of the vessel at 50 kg/cm² by charging pressurized carbon dioxide gas therein, superheated steam was fed into the jacket for the vessel to heat the shaped candy pieces at a temperature of 120° C. and to keep such a state for 30 minutes. Then, while maintaining the inner pressure of the vessel at said level, water was fed into the jacket, in lieu of the superheated steam, until a temperature of the candy pieces in the vessel becomes the room temperature. Thereafter, the pressure in the vessel was released by recovering the carbon dioxide gas to take out the desired candy pieces from the vessel.

A sample of the resulting candy product was dropped into a water-bath of 150 ml to measure intensity of sound to be generated, as it melts and to find out that it generates pleasant sounds, each having a sound pressure of 60 dB. Further, the measurement similar to the above was carried out, after having reserved another sample candy for 4 weeks under a relatively high temperature condition of 40° C., but the sample candy generates pleasant sounds, as its melts, each of which has a sound pressure having no noticeable difference from that generated by the candy product immediately after its production.

What is claimed is:

1. A method of producing a candy article containing pressurized gas entrapped therein which comprises heating a mixture of water and at least one raw material selected from the group consisting of sucrose, glucose, lactose, corn syrup, and a starch hydrolyzate containing oligosaccharides to a temperature of about 140° to 160° C. sufficient to dissolve said raw material in said water and to condense such; forming fine air bubbles in said condensate; cooling and shaping said condensate into shaped candy pieces; contacting such pieces with liquid nitrogen; removing such pieces from said liquid nitrogen contact and placing them in a pressure vessel means; pressuring said vessel means with an inert gas to a pressure of about 10 to 50 kg/cm²; heating said candy pieces in said pressure vessel means to a temperature of about 100° to 140° C. sufficient to partially melt said pieces and to cause at least some of said pressurizing gas to become mixed therewith; while maintaining the pressure in said pressure vessel means, cooling said candy pieces sufficient to solidify such and to thereby entrap said gas therein; then releasing the pressure in said vessel means; and recovering the solidified, cooled candy pieces containing gas entrapped therein.

2. A method as claimed in claim 1, wherein the step of forming fine air bubbles in the condensate is carried out by stirring the condensate under a pressure.

3. A method as claimed in claim 1, wherein the step of forming fine air bubbles in the condensate is carried out by pulling the same at a condensate temperature of 90°–110° C.

4. A method as claimed in claim 1, wherein the step of forming fine bubbles in the condensate is carried out until a volume of fine air bubbles reaches at least 5% based on that of the condensate.

5. A method as claimed in claim 1, wherein said inert gas is carbon dioxide gas.

6. The method as claimed in claim 1 wherein said contact with liquid nitrogen is accomplished by dipping in liquid nitrogen.

7. A method as claimed in claim 6, further comprising a step for wrapping each of the shaped candy pieces in a cold-resistrant wrapping material, prior to dipping such into liquid nitrogen.

8. A method as claimed in claim 7, wherein said cold-resistrant wrapping material is selected from the group consisting of aluminum foil, polyester film with an aluminum layer formed thereon by vacuum evaporation, and a laminated sheet of polyester film and aluminum foil.

* * * * *